(12) United States Patent
Cohen et al.

(10) Patent No.: US 10,925,213 B1
(45) Date of Patent: Feb. 23, 2021

(54) BUCKING MACHINE WITH INTERNAL MOTOR ROLLERS

(71) Applicant: Big Time, LLC, Granville, TN (US)

(72) Inventors: Larry Cohen, Granville, TN (US); Merton Daryl Haack, Buffalo Valley, TN (US)

(73) Assignee: Big Time, LLC, Granville, TN (US)

(*) Notice: Subject to any disclaimer, the term of this patent is extended or adjusted under 35 U.S.C. 154(b) by 0 days.

(21) Appl. No.: 16/797,330

(22) Filed: Feb. 21, 2020

(51) Int. Cl.
*A01D 45/06* (2006.01)
*A01G 3/00* (2006.01)
*A01D 45/16* (2006.01)
*A01F 11/00* (2006.01)

(52) U.S. Cl.
CPC ........... *A01D 45/065* (2013.01); *A01D 45/16* (2013.01); *A01F 11/00* (2013.01); *A01G 3/00* (2013.01); *A01G 2003/005* (2013.01)

(58) Field of Classification Search
CPC ........ A01G 2003/005; A01G 2005/005; A01G 3/00; A01D 45/16; A01D 45/065; A01D 45/10; A01D 46/02; A23N 15/01; A23N 15/02; A01F 11/02; A01F 11/00; A24B 5/00; A24B 1/06
USPC ........................................................ 460/134
See application file for complete search history.

(56) References Cited

U.S. PATENT DOCUMENTS

| 4,773,434 A * | 9/1988 | Miyake ................. A01D 45/16 131/313 |
| 5,331,980 A * | 7/1994 | Bailey ................... A01D 45/16 131/290 |
| 7,373,960 B1 * | 5/2008 | Westbrook ........... A01G 23/093 144/208.3 |
| 10,213,788 B2 * | 2/2019 | Bates ..................... A61K 36/00 |
| 2016/0374386 A1 * | 12/2016 | Desmarais ............ A01D 46/02 460/137 |
| 2018/0054973 A1 * | 3/2018 | Raichart .............. A01D 46/247 |
| 2018/0077866 A1 * | 3/2018 | Perez ...................... A01D 25/04 |
| 2018/0303033 A1 * | 10/2018 | Jones ..................... A23N 15/02 |
| 2020/0002846 A1 * | 1/2020 | Peco ....................... B02C 23/08 |

\* cited by examiner

*Primary Examiner* — Alicia Torres
(74) *Attorney, Agent, or Firm* — Waller Lansden Dortch & Davis, LLP; Matthew C. Cox

(57) ABSTRACT

A bucking machine with internal motor rollers includes a frame and first and second rollers mounted on the frame. Each of the first and second rollers includes an internal housing inside the roller, and a motor is disposed inside the internal housing within each roller. Each motor is completely housed inside the roller such that external motors are not necessary to drive rotation of the rollers. Each motor roller is connected to a motor control via a cable that provides power and instructions to the motor. A stem on a plant is inserted into a bore in a debudding cone such that the stem is received between the first and second rollers and is pulled through the machine. As the stem is pulled through the machine between the first and second rollers the flower is separated from the stem by engagement with the debudding cone.

20 Claims, 11 Drawing Sheets

BUCKING MACHINE WITH INTERNAL MOTOR ROLLERS

BACKGROUND

The present disclosure relates to devices and methods for agriculture and more particularly to devices and methods for separating plant flowers from plant stems and stalks. Such devices and methods are particularly useful for processing hemp.

Conventional bucking machines are devices for separating plant flowers from stems and are known in the art. Some conventional bucking machines include one or more rotating drums driven by an external motor. A belt or transmission communicates rotary motion of the motor to the drum, causing the drum to rotate. A harvested plant may be placed against the drum to strip flowers from the stem and stalk. Such conventional devices may be referred to as separating machines or bucking machines in some applications. In some applications, the drum pulls the flowers off the stalk while a user holds the stalk stationary or pulls the stalk away from the machine. In other applications, the drum pulls the stalk into the machine away from the user and strips the flowers from the stalk by pulling on the stalk.

Such conventional stripping or bucking machines are generally quite large, and are difficult to move around from place to place. Additionally, conventional bucking machines are often too heavy for a user to lift and move by hand or in a vehicle.

Another problem with conventional stripping and bucking machines for processing agriculture, and particularly hem, is that conventional machines often have external motors that drive a rotating drum using a mechanical linkage such as a belt, chain or transmission. The external drive mechanism is exposed and may be dangerous for users who may get their clothing, hair or hands caught in the motor or linkage. Additionally, large external motors are quite bulky and increase the overall form factor of the machine, making it more difficult to easily move or handle. Such external motor drives are also expensive and susceptible to breakage or jamming.

What is needed, then are improvements in bucking machines for processing agriculture, and specifically for stripping or removing hemp flowers from stems and stalks.

BRIEF SUMMARY

The present disclosure includes a bucking machine with internal motor rollers. Specifically, the disclosure includes a bucking machine including a first roller having a first motor disposed inside the first roller, and a second roller having a second motor disposed inside the second roller. The first and second motors are housed entirely inside their respective rollers in some embodiments. Thus, it is possible to eliminate the need for external drive motors and transmissions outside the rollers for driving rotation. These improvements provide safer and more reliable bucking machines over conventional devices.

In additional embodiments, the disclosure includes a bucking machine with internal motor rollers having first and second handles to assist a user in moving the machine.

Another objective of the present disclosure is to provide an easily portable bucking machine.

A further objective of the present disclosure is to provide a compact bucking machine that can be used on a table, desktop or other surface.

Yet another objective of the present disclosure is to provide a bucking machine with more compact components including first and second DC motors installed directly inside first and second respective rollers.

Another objective of the present disclosure is to provide a bucking machine with an open back ejection bay to eject stems from the machine after flowers have been detached from the stems.

A further objective of the present disclosure is to provide a bucking machine for removing hemp flowers from hemp stems.

Yet another objective of the present disclosure is to provide a bucking machine with a front panel having a switch plate and an emergency shutoff switch.

Another objective of the present disclosure is to provide a bucking machine having a top panel including a work surface on the top of the machine to allow user to place items on top of the machine.

Yet another objective of the present disclosure is to provide a bucking machine having a tray on the top of the machine for storing items.

A further objective of the present disclosure is to provide a bucking machine including an electronics bay above the first and second rollers to protect electronics such as a power supply and a motor controller from the rotating rollers.

Numerous other objects, advantages and features of the present disclosure will be readily apparent to those of skill in the art upon a review of the following drawings and description of a preferred embodiment.

DETAILED DESCRIPTION

Figure 1:
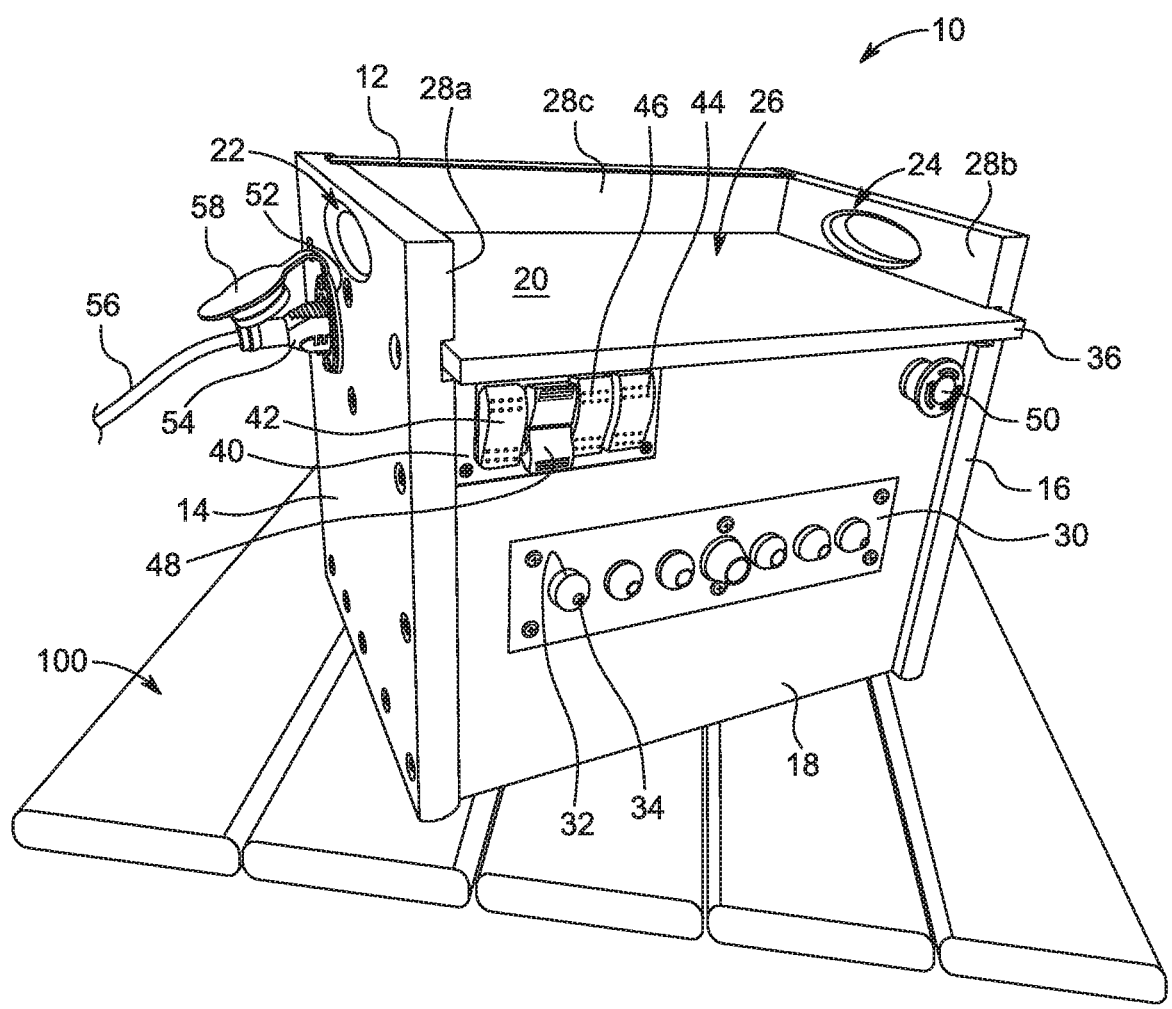
FIG. 1 is a perspective view of an embodiment of a bucking machine apparatus in accordance with the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Referring to the drawings, FIG. 1 illustrates a front perspective view of an embodiment of a bucking machine 10 having internal motor rollers. Machine 10 includes a frame 12 forming the shape of a rectangular box in some embodiments. Machine 10 includes a frame 12 having a first side panel 14 and a second side panel 16. A front pane 18 spans between the first and second side panels 14, 16. A top panel 20 is positioned on the top of the machine 10.

In some embodiments, a tray 26 is formed above the top panel 20. Tray 26 provides a storage area and a working surface to allow a user to temporarily place items on the tray 26. Tray 26 is integrally formed in the machine 10 using a portion of the first and second side panels 12, 14 extending slightly above the top panel 20. Tray 26 includes a first tray side 28a, second tray side 28b and a back tray side 28c. In some embodiments, tray 26 includes an open front side.

Referring further to FIG. 1, in some embodiments machine 10 is configured to be easily moveable by a user. Machine 10 is dimensioned such that it may be placed on a table or desktop, such as a surface 100. Machine 10 is thus intended to be a portable device to be easily handled by a user in some applications. To achieve this goal, in some embodiments, machine 10 includes a first handle 22 and a second handle 24. Each of first and second handles 22, 24 are integrally formed on machine 10 in some embodiments. For example, as seen in FIG. 1, first handle 22 is formed from an opening defined in the upper end of first side panel 14. Similarly, second handle 24 is formed by an opening defined in the upper end of second side panel 16. A user may grasp first handle 22 and second handle 24 at the same time to lift and carry machine 10.

Machine 10 also includes a front inlet panel 30 disposed on front panel 18. Inlet panel 30 in some embodiments includes a removable face plate secured to front panel 18 with a plurality of fasteners, such as screws. One or more debudding cones 32 are disposed on inlet panel 30. Each debudding cone 32 includes a truncated cone shape with the base of the cone positioned against the inlet panel. Each debudding cone 32 includes a stem opening 34 defined as a bore through the cone and inlet panel 30. Each debudding cone 32 includes a different bore diameter in some embodiments to receive different sizes of plant stems.

An external power plug 54 may be inserted into a plug receptacle 52 in some embodiments. Plug 54 includes a male or female 110V AC plug in some embodiments. Power is supplied to machine 10 via a power cord 56 that is plugged into the machine at one end and a standard electrical outlet at the other end. A plug receptacle cover 58 is positioned on the plug receptacle 52 in some embodiments. Plug receptacle cover 58 may be used to temporarily close plug receptacle 52 during non-use or transport to protect the plug receptacle 52 from debris, damage or moisture. For example, for transport, the plug 54 may be simply unplugged from plug receptacle 52, and receptacle cover 58 is pressed into the plug receptacle 52 to close it.

Figure 11:
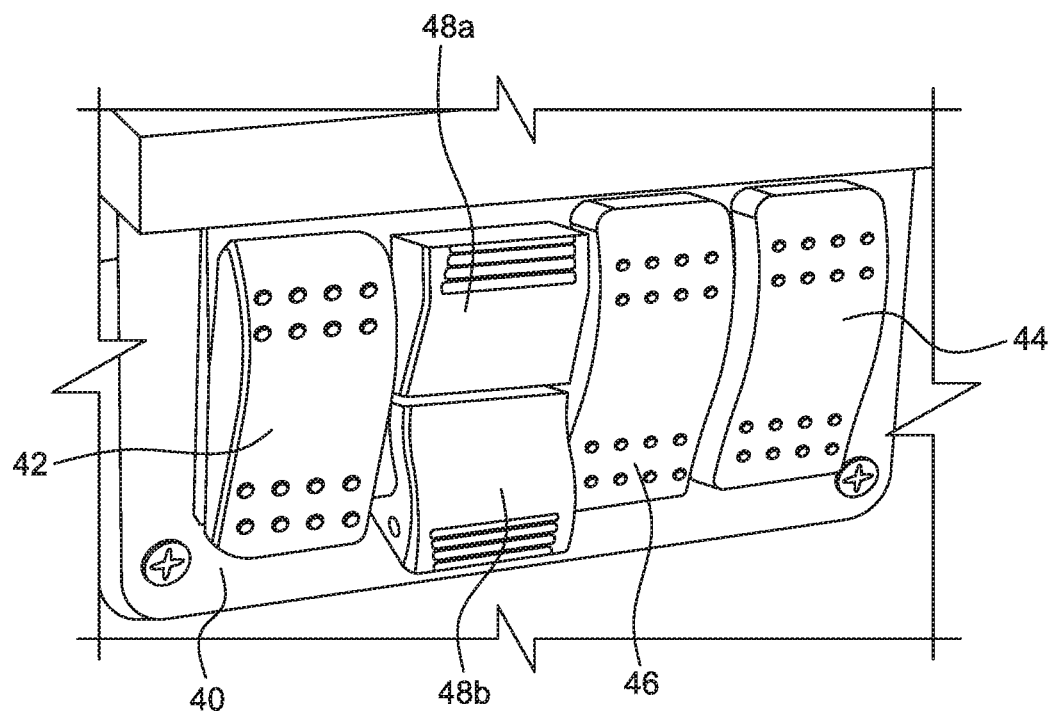
FIG. 11 is a detail perspective view of an embodiment of a switch panel on a bucking machine in accordance with the present disclosure.

Referring further to FIG. 1 and FIG. 11, machine 10 includes a switch panel 40 including one or more switches used to operate the machine. In some embodiments, an on-off switch 42 provides a switch to turn power to the machine on or off. A speed switch 44 is also disposed on switch panel 40 in some embodiments. Speed switch 44 allows a user to set a low or high roller speed setting. A forward-reverse switch 46 is also positioned on switch panel 40 in some embodiments. Forward-reverse switch 46 allows the rollers inside the machine to be operated in a forward setting to pull stems into the machine or in a reverse setting push stems out of the machine via the bores in the debudding cones 32. For example, if a roller became jammed, it would be desirable to change the direction of the rollers to push the stems back out to clear the jam. Additionally, in some embodiments, an auxiliary port 48 such as a USB port is provided on the front of the switch panel 40. Auxiliary port 48 provides a USB port in some embodiments. Auxiliary port 48 may be used as a power source for charging an auxiliary device such as a cell phone or a laptop. In other embodiments, auxiliary port 48 provides an interface for programming or providing digital communication with a motor controller housed inside the machine. Also shown in FIG. 1, an emergency stop switch 50 is provided to allow a user to immediately stop operation of the machine 10 in case a risk of injury or malfunction such as a jam occurs.

Figure 2:
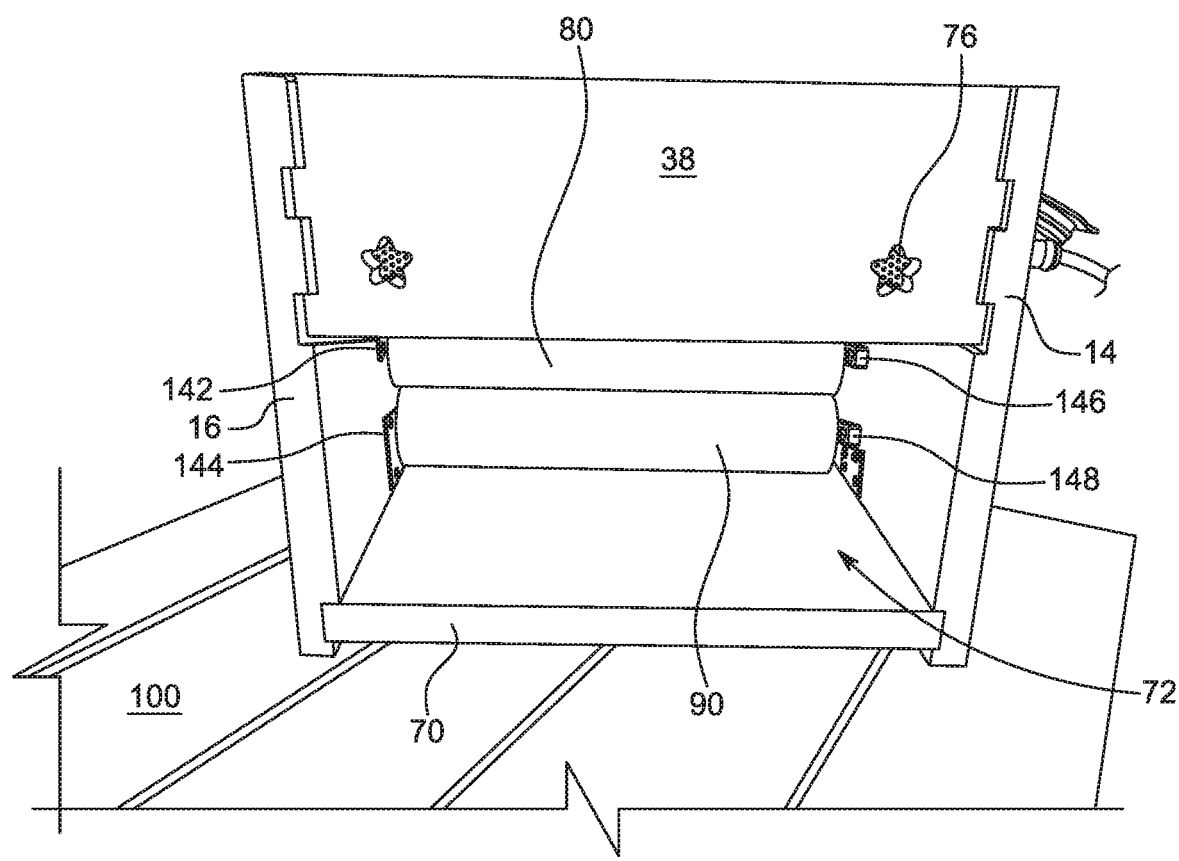
FIG. 2 is a back perspective view of an embodiment of a bucking machine apparatus in accordance with the present disclosure.

Bucking machine 10 includes first and second rollers inside the machine. As shown in FIG. 2, a first roller 80 is positioned above a second roller 90. First and second rollers 80, 90 are generally formed in the shape of a cylinder. Each roller 80, 90 is configured such that it is operable to rotate independent of the frame. The back of machine 10 includes an ejection opening 72 that provides a clearance space for stems to be ejected out of the back of the machine. A back panel 38 is disposed above the ejection opening 72 to partially close the back of the machine 10. However, ejection bay 72 stays open at all times during use. A first vent 76 is disposed on back panel 38 to allow air to vent to electronics housed inside machine 10.

Figure 3:
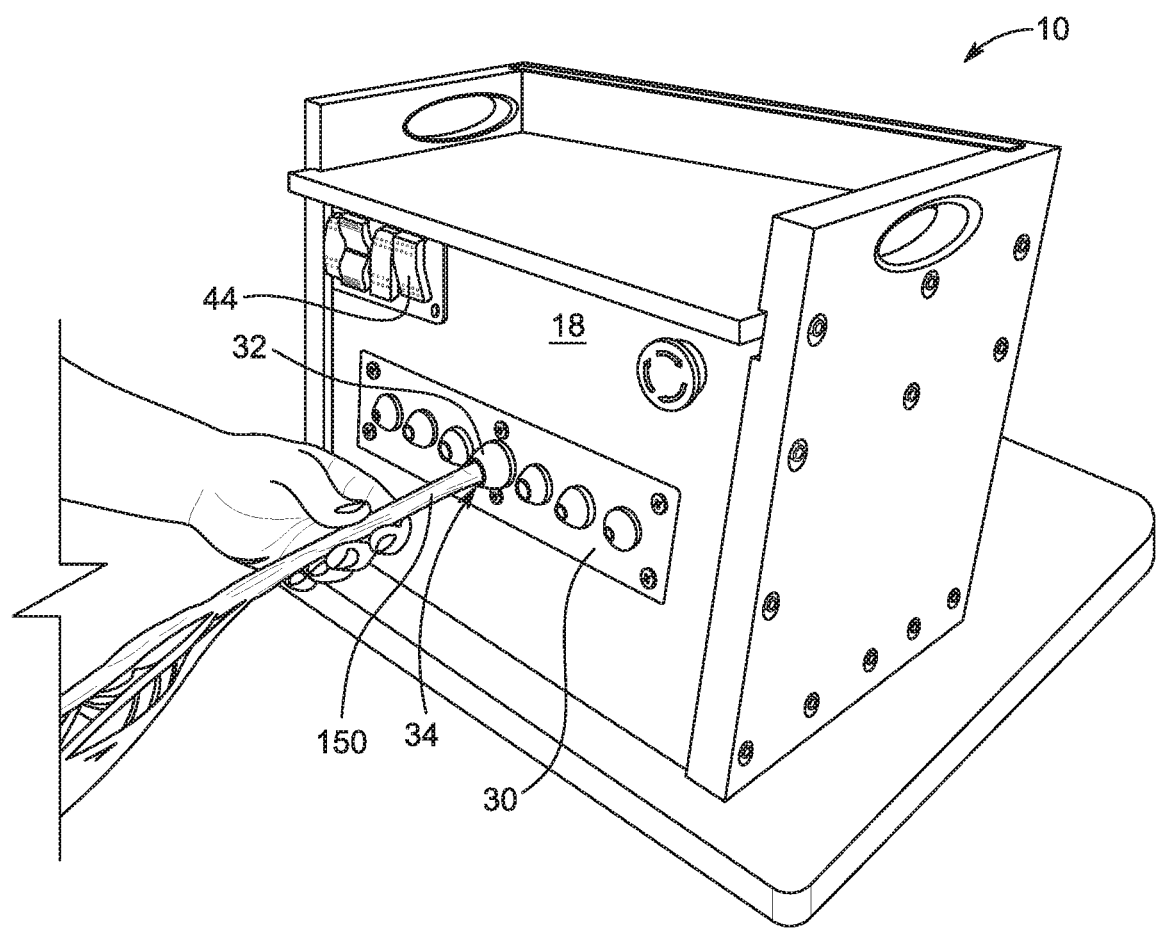
FIG. 3 is a front perspective view of an embodiment of a bucking machine apparatus in accordance with the present disclosure with a plant stem initially inserted into an inlet opening.

Referring now to FIG. 3 to FIG. 6, machine 10 may be used in a procedure to remove buds or flowers from a stem on a harvested plant. For example, as shown in FIG. 3, a stem 150 of a harvested plant is inserted into the inlet opening 34 of one debudding cone 32. The user selects the debudding cone with a bore opening sized to accommodate the thickness of the stem. For more narrow stems, a user may select a debudding cone with a smaller diameter opening. For larger diameter stems, a user may select a debudding cone with a larger diameter opening. The debudding cones may be screwed off the plate 30 and replaced or exchanged with different sizes in some applications.

Figure 4:
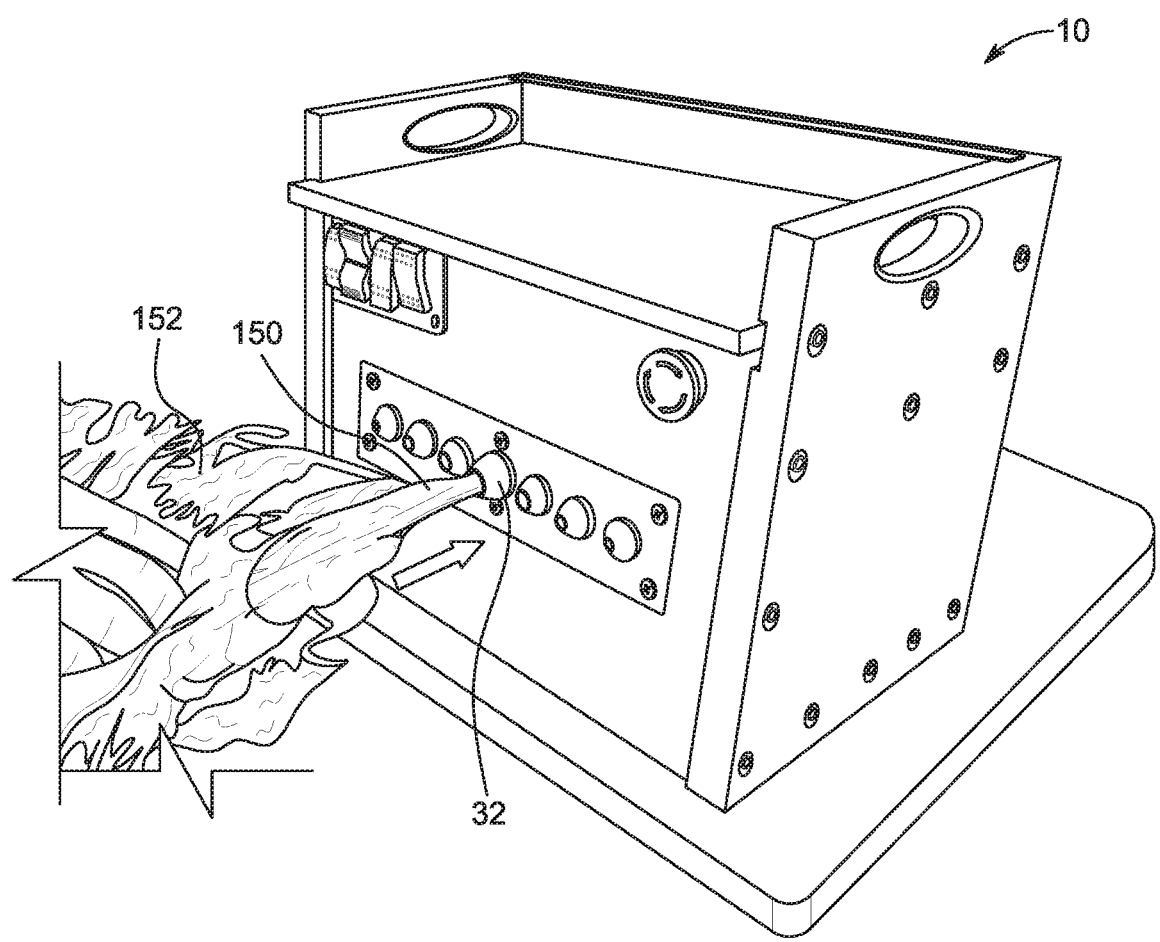
FIG. 4 is a front perspective view of the embodiment of a bucking machine of FIG. 3 with the plant stem pulled into the machine drawing the flowers toward the debudding cone.
Figure 5:
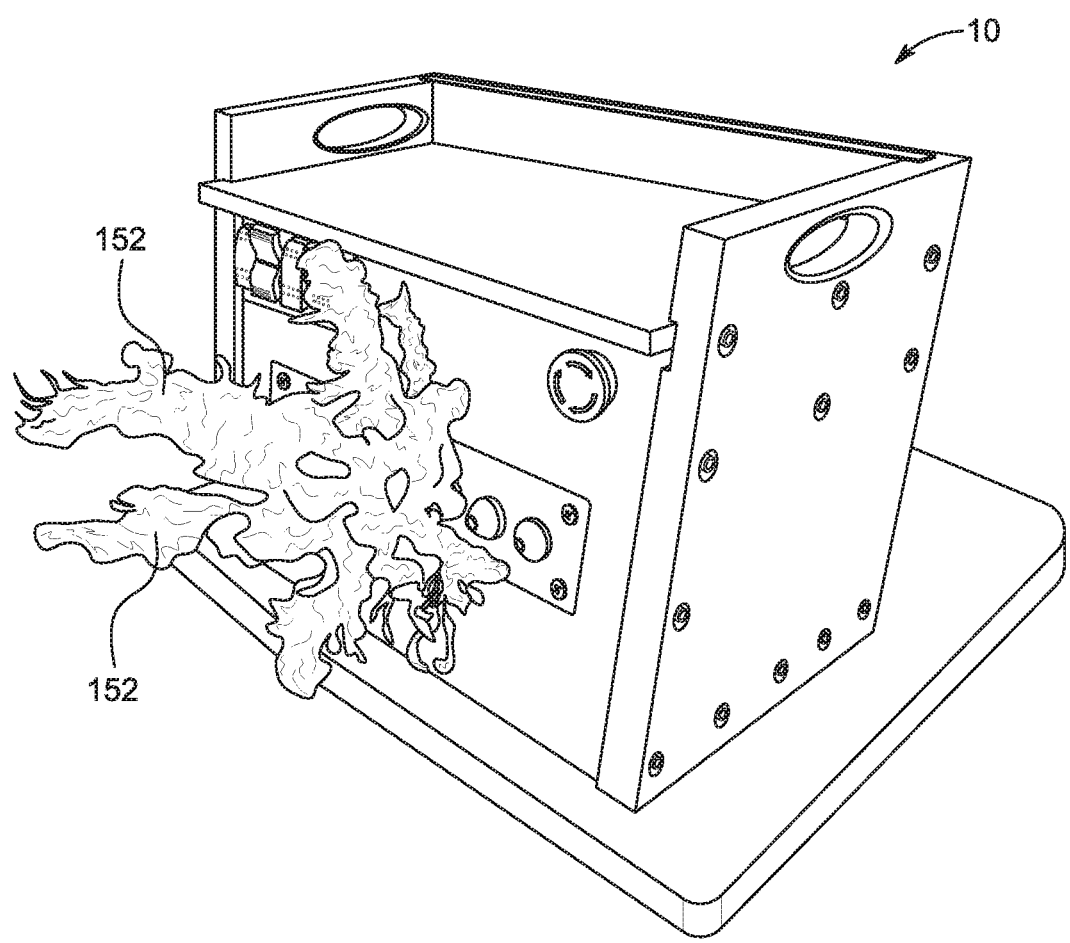
FIG. 5 is a front perspective view of the embodiment of a bucking machine of FIG. 3 and FIG. 4 with the plant pulled into the machine such that flowers are separated from the stem by the debudding cone.
Figure 6:
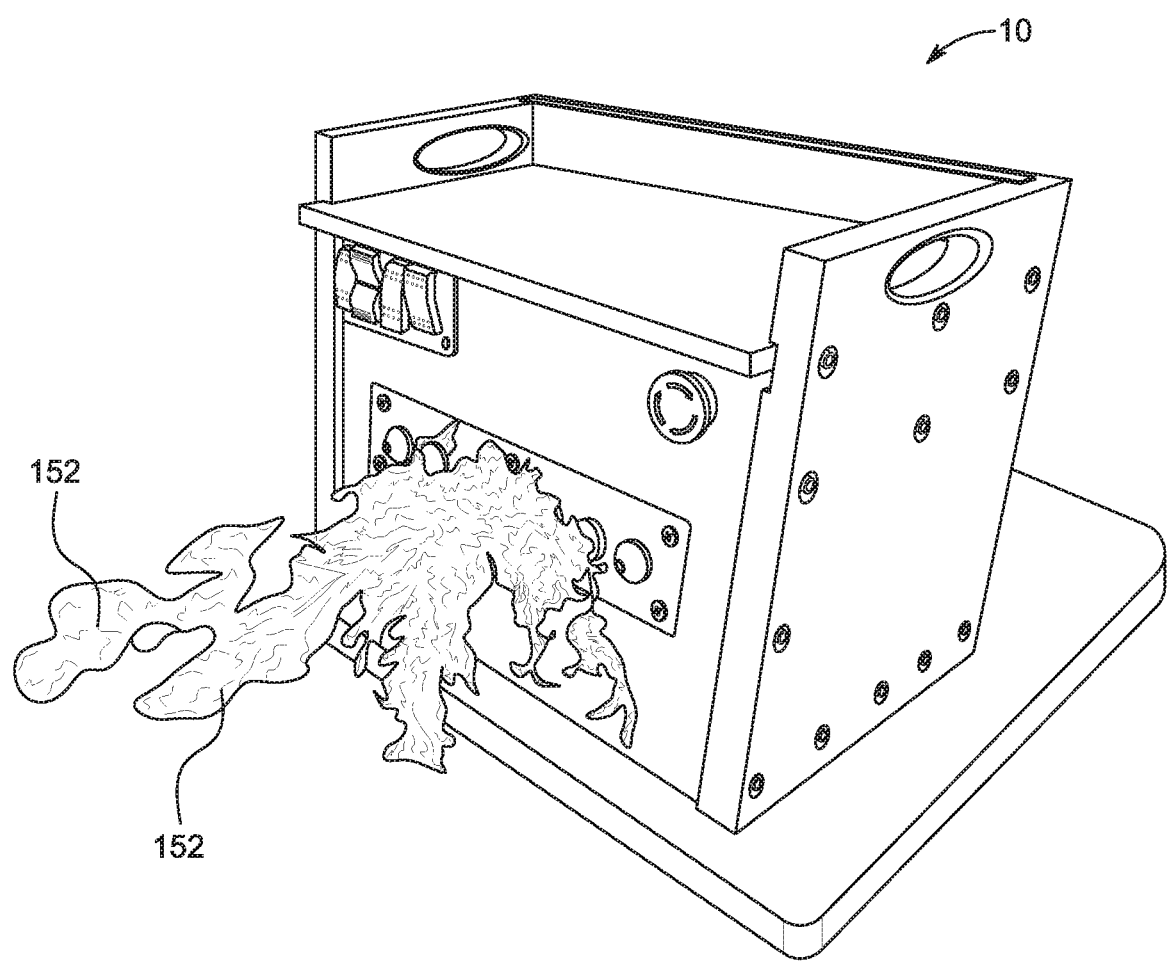
FIG. 6 is a front perspective view of the embodiment of a bucking machine of FIGS. 3-5 with the stem pulled entirely through the machine and the flowers fully separated from the stem by the debudding cone.

As the stem 150 is inserted into the inlet opening 34 in a debudding cone 32, the stem extends to the interior of the machine 10 and is engaged in a gap between the first and second rollers 80, 90. The stem is sandwiched between the rollers as the rollers roll in opposite directions, thereby drawing the stem further into the machine between the first and second rollers, as shown in FIG. 4. As the stem 150 is drawn farther into the machine 10 by first and second rollers 80, 90, the flowers 152 approach the debudding cone 32. The flowers press against the inlet panel 30 and are stripped from the stem as the stem 150 is drawn further through the rollers inside the machine. This causes the flowers, or buds, 152 to fully separate from the stem and to drop off into a collection bin below the machine 10 as shown in FIG. 6.

Figure 7:
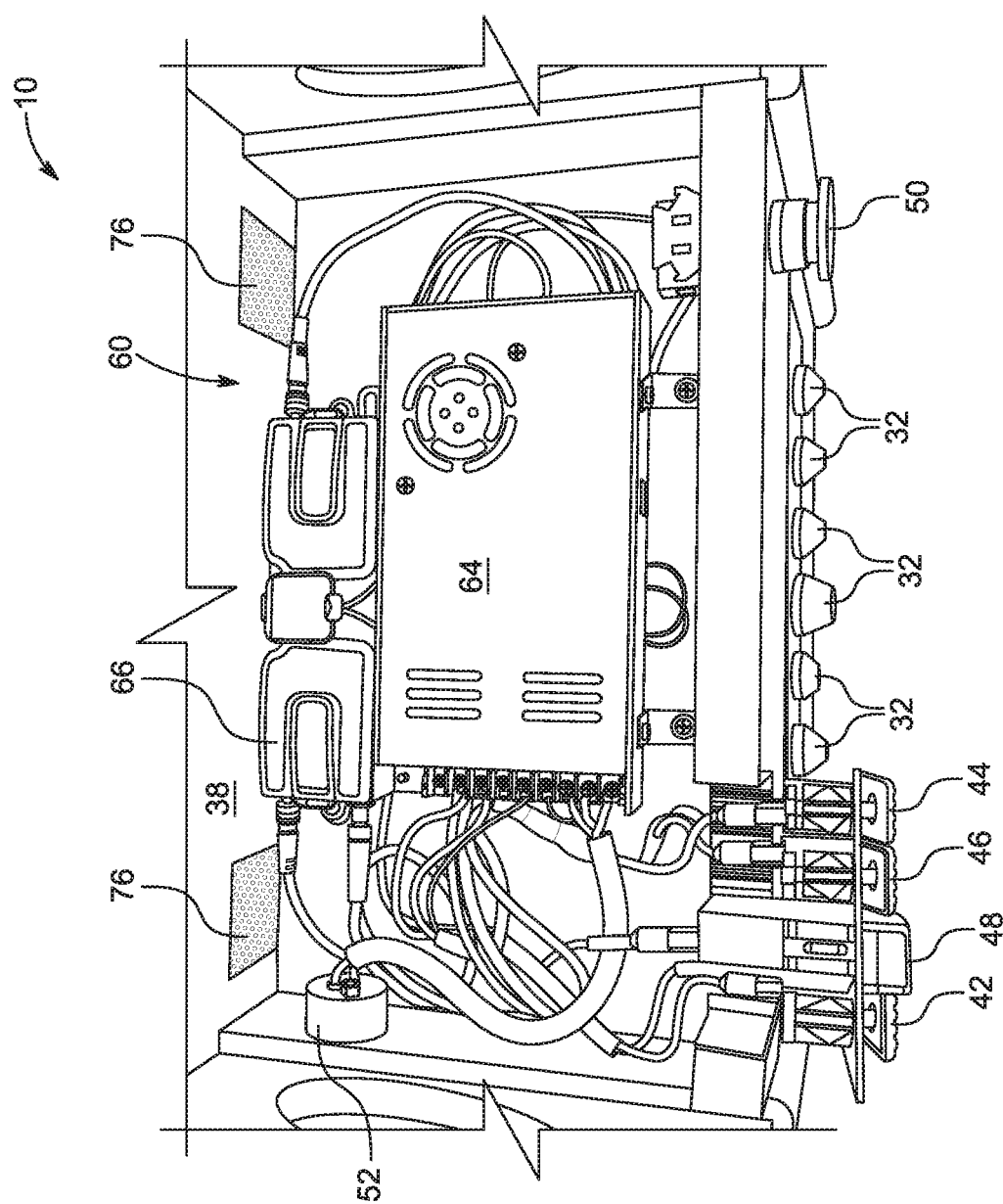
FIG. 7 is a top perspective view of the interior of an electronics bay on an embodiment of a bucking machine in accordance with the present disclosure.

Referring to FIG. 7, a view of the machine 10 with top panel 20 removed is shown. An electronics bay 60 is disposed below top panel 20. Electronics bay 60 houses and protects electronics used to operate the machine 10. Power comes into the machine 10 via the plug receptacle 52. A power supply 64 is disposed in electronics bay 60. Power supply 64 in some embodiments includes an AC/DC transformer receiving input power at 110V AC and providing output power at 24V DC. Power supply 64 may include any suitable power supply for providing power to a motor control circuit.

Figure 8:
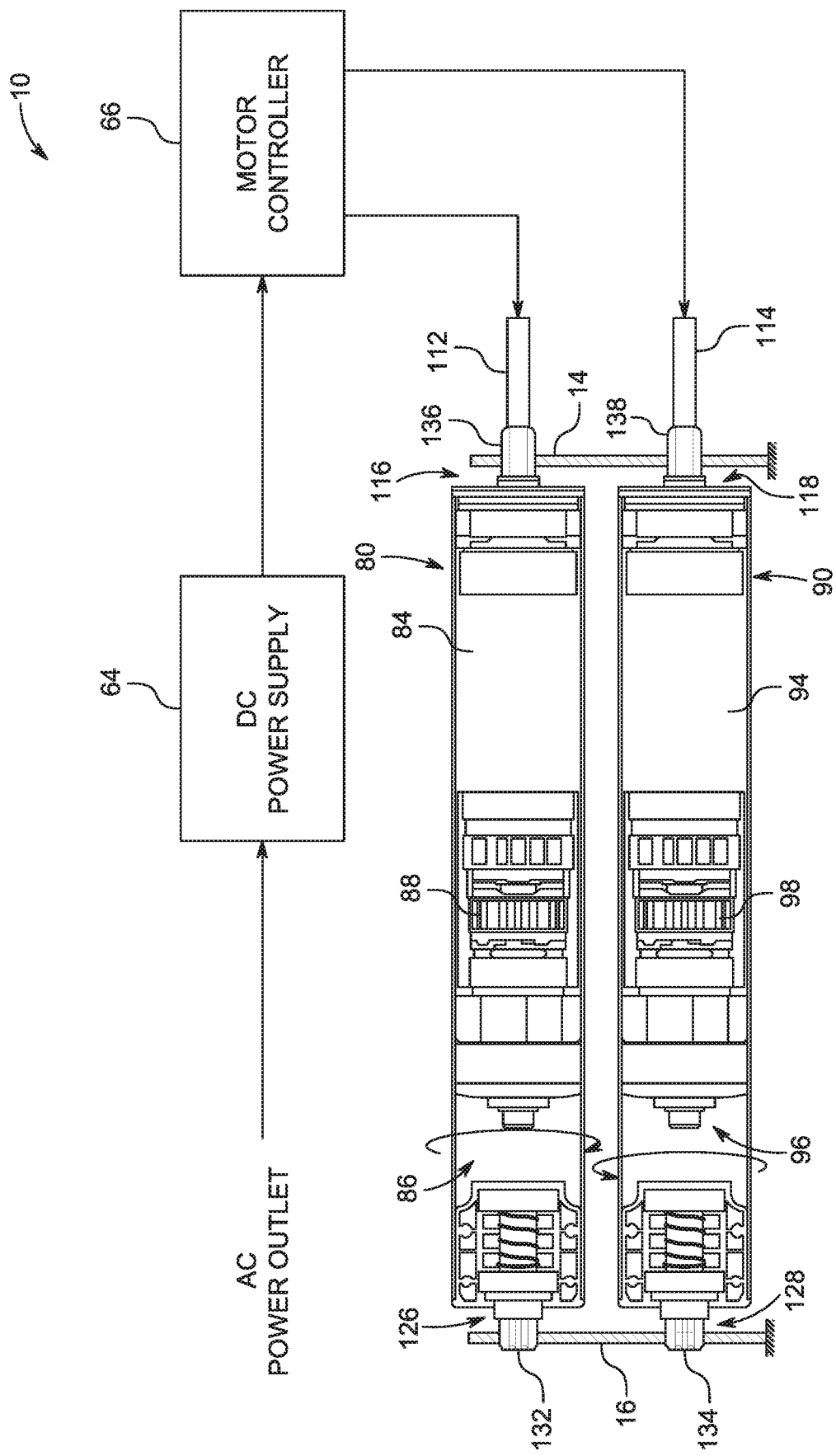
FIG. 8 is a schematic view of an embodiment of a bucking machine with internal motor rollers in accordance with the present disclosure.

A motor controller 66 is also provided in the electronics bay 60 in some embodiments. Motor controller 66 is configured to control first and second rollers 80, 90. Referring to FIG. 8, in some embodiments, first and second rollers 80, 90 include internal motor rollers.

First Roller

For example, first roller 80 includes a cylindrical shape, including an interior housing 86. A first motor 84 is disposed in interior housing 86 of first roller 80. First roller 80 thus may be referred to as an internal motor roller because the motor 84 that rotates first roller 80 is housed inside the first roller 80. First motor 84 is coupled to a first gearbox 88 also included inside the internal housing 86 in first motor 80. A first motor cable 112 is coupled to a first channel on motor controller 66. First motor cable 112 provides power and input signal to first motor 80. First motor 80 includes a cable end and a non-cable end.

Figure 9:
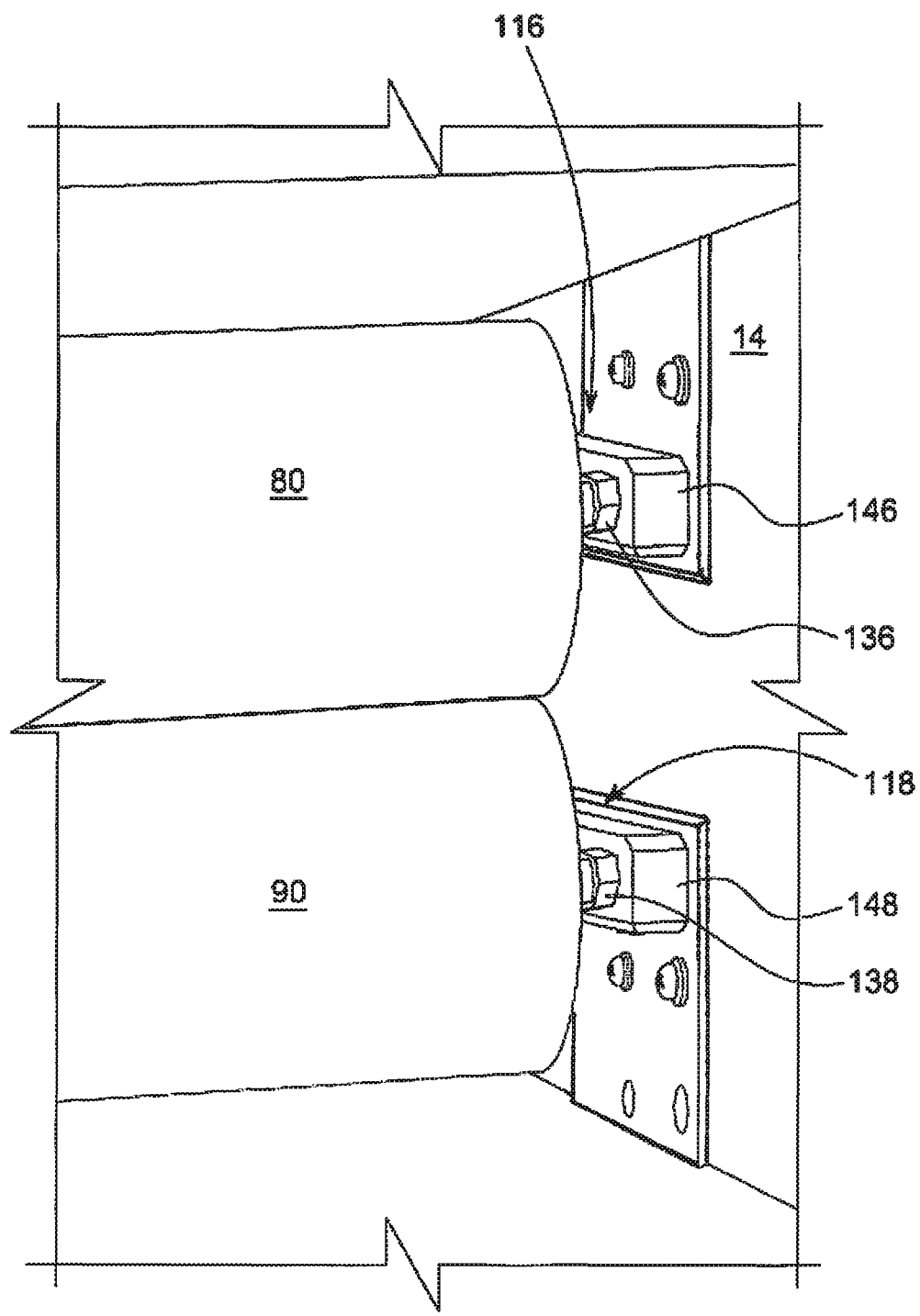
FIG. 9 is a detail perspective view of an embodiment of rollers with internal motors on a bucking machine in accordance with the present disclosure.

As shown in FIG. 9, a first roller cable end lug 136 protrudes axially from the cable end of first motor 80. First roller cable end lug 136 is mounted to a fixed structure, such as first side panel 14 in some embodiments. In some embodiments, first roller cable end lug 136 is secured to a stationary first roller cable end bracket 146 that is secured to the side panel. During use, first roller cable end lug 136 stays stationary, and first roller 80 rotates relative to first roller cable end lug 136 during use. Thus, a first roller cable end coupling 116 is formed between first roller 80 and first roller cable end lug 136.

Similarly, a first roller non-cable end lug 132 protrudes axially from the opposite end of the first roller 80. First roller non-cable end lug 132 is also mounted to a fixed structure, such as second side panel 16 on frame 12. In some embodiments, first roller non-cable end lug 132 is secured to an intermediate structure such as a stationary first roller non-cable end bracket 142 that is secured to the side panel. During use, first roller non-cable end lug 132 stays stationary, and first roller 80 rotates relative to first roller non-cable end lug 132. Thus, a first roller non-cable end coupling 126 is formed between first roller 80 and first roller non-cable end lug 132.

First roller 80 is an improvement over conventional rollers used in bucking machines because it includes the motor and gearbox housed inside the roller. This eliminates the need for an external motor and drive linkage such as a belt, chain or transmission outside of the roller. By placing the motor and gearbox inside the roller, additional hardware outside the roller is not necessary, resulting in a safer and more compact bucking machine 10.

In some embodiments, first roller 10 includes a DC motor roller such as the Senergy line of motor rollers from PULSEROLLER of Erlanger, Ky. Other suitable motor rollers may be used, provided the roller includes a suitable motor housed inside the roller operable to rotate the roller using the motor housed within the roller.

Second Roller

Bucking machine 10 also includes a second roller 90 housed inside the machine. Second roller 90 is substantially identical to first roller 80 in some embodiments, except it is configured to rotate in the opposite direction. For example, referring to FIG. 8, second roller 90 includes a cylindrical shape, including an interior housing 96. A second motor 94 is disposed in interior housing 96 of second roller 90. Second roller 90 thus may be referred to as an internal motor roller because the motor 94 that rotates second roller 90 is housed entirely inside the second roller 90. Second motor 94 is coupled to a second gearbox 98 also included inside the internal housing 96 in second motor 90. A second motor cable 114 is coupled to a second channel on motor controller 66. Second motor cable 114 provides power and input signal to second motor 90. Second motor 90 includes a cable end and a non-cable end.

A second roller cable end lug 138 protrudes axially from the cable end of second motor 90. Second roller cable end lug 138 is mounted to a fixed structure, such as first side panel 14 in some embodiments. In some embodiments, second roller cable end lug 138 is secured to a stationary second roller cable end bracket 148 that is secured to the side panel. During use, second roller cable end lug 138 stays stationary, and second roller 90 rotates relative to second roller cable end lug 138 during use. Thus, a second roller cable end coupling 118 is formed between second roller 90 and second roller cable end lug 138.

Similarly, a second roller non-cable end lug 134 protrudes axially from the opposite end of the second roller 90. Second roller non-cable end lug 134 is also mounted to a fixed structure, such as second side panel 16 on frame 12. In some embodiments, second roller non-cable end lug 134 is secured to an intermediate structure such as a stationary second roller non-cable end bracket 144 that is secured to the side panel. During use, second roller non-cable end lug 134 stays stationary, and second roller 90 rotates relative to second roller non-cable end lug 134 during use. Thus, a second roller non-cable end coupling 128 is formed between second roller 90 and second roller non-cable end lug 134.

Second roller 90 is an improvement over conventional rollers used in bucking machines because it includes the motor and gearbox housed inside the roller. This eliminates the need for an external motor and drive linkage such as a belt, chain or transmission outside of the roller. By placing the motor and gearbox inside the roller, additional hardware outside the roller is not necessary, resulting in a safer and more compact bucking machine 10.

In some embodiments, second roller 10 includes a DC motor roller such as the Senergy line of motor rollers from PULSEROLLER of Erlanger, Ky. Other suitable motor rollers may be used, provided the roller includes a suitable motor housed inside the roller operable to rotate the roller using the motor housed within the roller.

Referring back to FIG. 7, in some embodiments, a motor controller 66 includes a dual channel motor controller operable to control rotary motion of both the first and second rollers 80, 90. Motor controller 66 includes a ConveyLinx drive control form PULSEROLLER of Erlanger, Ky. in some embodiments. In other embodiments, motor controller 66 includes any suitable motor controller operable to control speed and direction of first and second rollers 80, 90. In some embodiments, motor controller 66 is coupled to the forward-reverse switch 46 and the speed switch 44. Motor controller 66 is configured to operate first roller 80 in a first direction and second roller 90 in a second direction. First roller 80 is coupled to a first channel on motor controller 66, and second roller 90 is coupled to a second channel on motor controller 66. Motor controller 66 includes a digital controller in some embodiments. In some embodiments, motor controller 66 is also coupled to auxiliary port 66 allowing a user to program motor controller 66 via computer interface.

Figure 10:
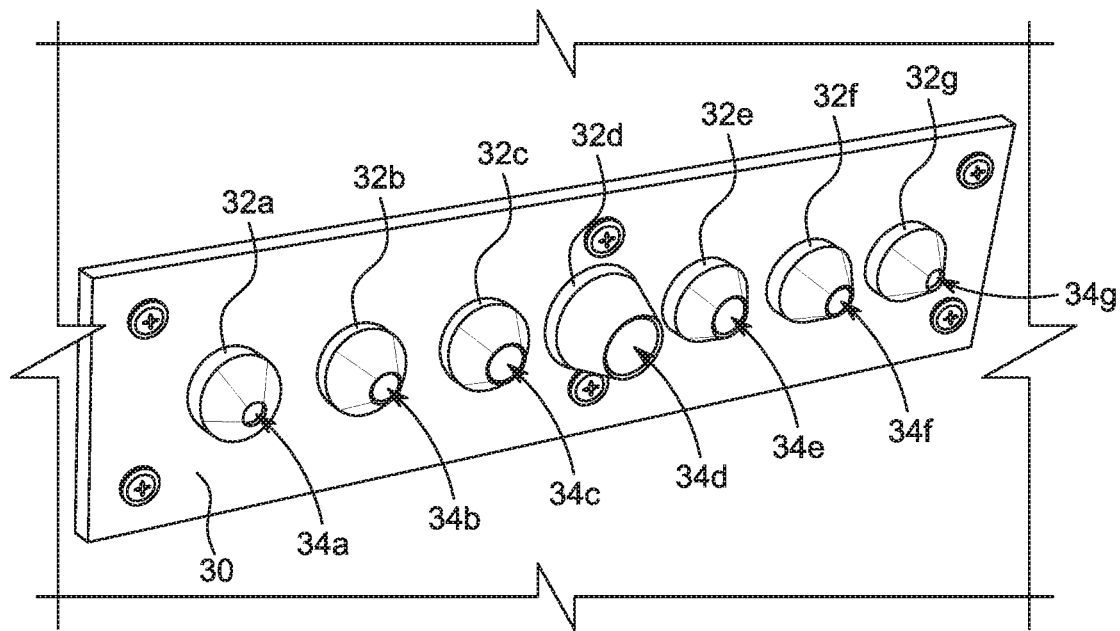
FIG. 10 is a detail perspective view of an embodiment of an inlet panel with a plurality of debudding cones on a bucking machine in accordance with the present disclosure.

Referring now to FIG. 10, in some embodiments input panel 30 includes a plurality of debudding cones 32a-32g. Multiple cones are provided to accommodate different sizes of stems. First debudding cone 32a includes a first inlet opening 34a dimensioned to accept a first stem of a first size. Second debudding cone 32b includes a second inlet opening 34b dimensioned to accept a second stem of a second size. Third debudding cone 32c includes a third inlet opening 34c dimensioned to accept a third stem of a third size. Fourth debudding cone 32d includes a fourth inlet opening 34d dimensioned to accept a fourth stem of a fourth size. Fifth debudding cone 32e includes a fifth debudding cone 34e dimensioned to accept a fifth stem of a fifth size. Sixth debudding cone 32f includes a sixth inlet opening 34f dimensioned to accept a sixth stem of a sixth size. Seventh debudding cone 32g includes a seventh inlet opening 34g dimensioned to accept a seventh stem of a seventh size. Each debudding cone includes a tapered profile forming a truncated cone. The sharp leading edge of each cone is configured to shave off buds or flowers from the stem material. Each debudding cone may be removed or replaced in some embodiments.

Figure 12:
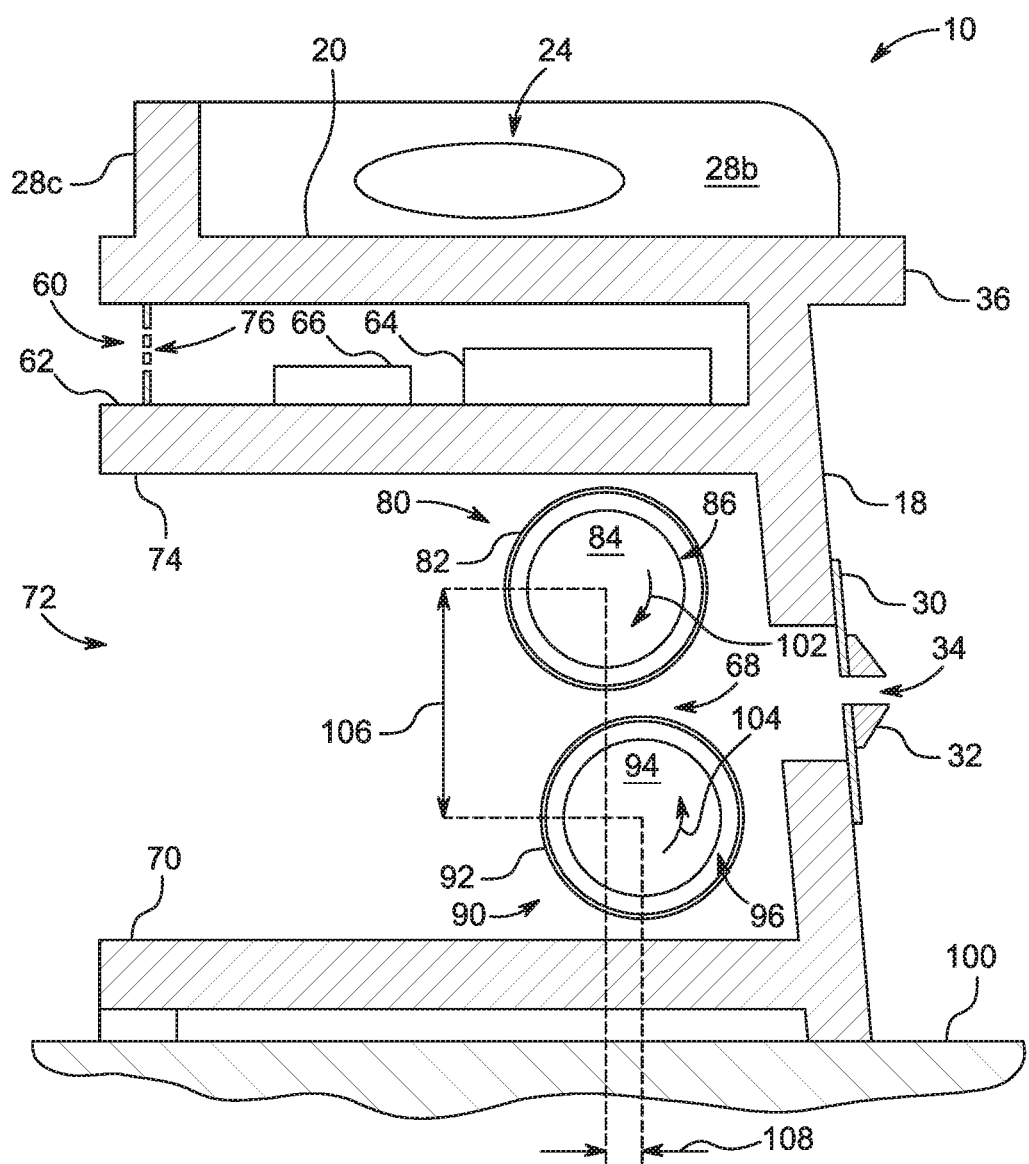
FIG. 12 is a partial cross-sectional view of an embodiment of a bucking machine with internal motor rollers in accordance with the present disclosure.

Referring further to FIG. 12, an example of a cross-sectional view of an embodiment of a bucking machine 10 is shown. Bucking machine 10 includes a first roller 80 and a second roller 90. Each of first and second rollers 80, 90 includes an outer coating layer to improve grip and wear characteristics as stems are passed between the rollers. For example, in some embodiments, first roller 80 includes a first outer coating layer 82 formed of a nitrile rubber blend. Outer coating layer 82 may include any other suitable material for improving grip, such as a rubber or polymer material. Second roller 90 also includes a second outer coating layer 92 formed of a nitrile rubber blend. Outer coating layer 92 may include any other suitable material for improving grip, such as a rubber or polymer material.

In some embodiments, the outer surface of the first roller 80 is separated from the outer surface of the second roller 90. During use, a stem is passed through the space between the first and second rollers 80, 90, and the stem is gripped by one or both roller outer coating layers to draw the stem through the machine and out the ejection bay 72 on the back side of the machine. In other embodiments, the outer surface of the first roller 80 contacts the outer surface of the second roller 90 such that the first and second rollers 80, 90 engage one another in a rolling contact. As such, an incoming stem is received between the first and second rollers 80, 90 and is compressed and drawn through the machine into the ejection bay 72.

In further embodiments, first roller 80 is positioned vertically above second roller 90 as shown in FIG. 12. First and second rollers 80, 90 are horizontally aligned on the same vertical axis in some embodiments. In other embodiments, first roller 80 is horizontally offset slightly behind second roller 90 along a different vertical axis by a horizontal roller offset 108 in some embodiments. Horizontal roller offset 108 in some embodiments is between about 0.5 inches and about 4.0 inches in some embodiments. Additionally, in some embodiments, first roller 80 is vertically offset above second roller 90 by a vertical roller offset 106 in some embodiments. Vertical roller offset 106 is greater than the sum of the first roller radius and the second roller radius in some embodiments. In other embodiments, vertical roller offset 106 is substantially equal to the sum of the first roller radius and the second roller radius. Vertical roller offset 106 is less than the sum of the first roller radius and the second roller radius in some embodiments where the horizontal roller offset 108 is great enough to allow such a configuration.

Also shown in FIG. 12, a base 70 provides a horizontal floor in ejection bay 72. Second roller 90 is positioned above base 70 such that second roller 90 is able to roll freely without contacting base 70. Similarly, a roof 74 provides a horizontal upper surface inside ejection bay 72. First roller 80 is positioned below roof 74 such that first roller 80 is able to roll freely without contacting roof 74. Electronics shelf 62 is positioned above first and second rollers 80, 90. A power supply 64 and a motor controller 66 are positioned on electronics shelf 62 inside electronics bay 60. The cables extending between motor controller 66 and first and second rollers 80, 90 are routed from electronics bay 60 into the chamber housing first and second rollers 80, 90. In some embodiments, first roller 80 is controlled by a first motor controller, and second roller 90 is controlled by an independent second motor controller. In alternative embodiments, first roller 80 and second roller 90 are both controlled by a single motor controller with two output channels, wherein a first output channel is connected to first roller 80 and a second output channel is connected to second roller 90.

Referring further to FIG. 12, a stem may be inserted into inlet opening 34 on a debudding cone 32. The stem is passed into the stem passage 68 and is received between the first and second rollers 80, 90. The stem is engaged by the material of the first outer layer 82 on first roller and the material of the second outer layer 92 on the second roller. A first motor 84 is positioned in the first roller interior housing 86 on the first roller 80, and a second motor 94 is positioned in the second roller interior housing 96 on the second roller 90. First roller 80 rotates in a first roller rotation direction 102, and second roller 90 rotates in a second roller rotation direction 104. In some embodiments, first roller rotation direction 102 is opposite second roller rotation direction 104. During use, the first and second rollers 80, 90 rotate in opposite directions to draw a stem from the stem passage 68 through the rollers and into the ejection bay 72. The stems may move freely outside the back of the machine 10 through the ejection bay 72.

In further embodiments, the present disclosure provides a method of removing hemp flower from a stem. The method includes the steps of inserting a stem of a hemp plant into an opening in a debudding cone on a bucking machine; receiving the stem between a first motor roller and a second roller; rotating the first and second motor rollers in opposite directions to draw the stem into the bucking machine; engaging the hemp flower on the debudding cone as the stem is drawn into the bucking machine; and separating the hemp flower from the stem.

The method further includes ejecting the stem out an open ejection bay on the back of the machine in some embodiments.

The method further includes rotating the first roller using a motor housed inside the first roller in some embodiments.

The method further includes rotating the second roller using a motor housed inside the second roller in some embodiments.

The method further includes rotating the first roller using a first motor housed inside the first roller and simultaneously rotating the second roller using a second motor housed inside the second roller in some embodiments.

Thus, although there have been described particular embodiments of the present invention of a new and useful BUCKING MACHINE WITH INTERNAL MOTOR ROLLERS, it is not intended that such references to particular embodiments be construed as limitations upon the scope of this invention.

What is claimed is:

1. A bucking machine, comprising:
   a frame including a first side panel and a second side panel;
   a front panel disposed between the first and second side panels;
   an inlet panel disposed on the front panel;
   a plurality of debudding cones disposed on the inlet panel, each debudding cone defining an inlet opening shaped to receive a stem of a plant;
   a switch panel disposed on the front panel;
   a first roller disposed between the first and second side panels behind the front panel;
   a second roller disposed between the first and second side panels behind the front panel and below the first roller;
   a first electric motor disposed inside the first roller;
   a second electric motor disposed inside the second roller;
   an electronics bay including an electronics shelf disposed above the first roller and the second roller; and
   a motor controller disposed within the electronics bay and connected to the first and second motors, wherein the motor controller is configured to rotate the first and second rollers.

2. The machine of claim 1, wherein the motor controller is configured to rotate the first and second rollers in opposite directions.

3. The machine of claim 1, further comprising:
   a first handle disposed on the first panel, and a second handle disposed on the second panel.

4. The machine of claim 3, further comprising a tray positioned above the front panel.

5. The apparatus of claim 4, wherein the tray includes a front ledge protruding beyond the front panel.

6. The apparatus of claim 4, wherein the first roller includes an outer layer comprising nitrile rubber.

7. The apparatus of claim 6, wherein the second roller includes an outer layer comprising nitrile rubber.

8. The apparatus of claim 7, wherein the first and second rollers are aligned along the same vertical axis.

9. The apparatus of claim 7, wherein the first and second rollers are horizontally offset by a horizontal offset distance.

10. The apparatus of claim 9, wherein the horizontal offset distance is between 0.5 inches and 4.0 inches.

11. The apparatus of claim 9, wherein the first and second rollers are in rolling contact.

12. The apparatus of claim 9, wherein the first and second rollers are separated by a gap.

13. A bucking machine for removing hemp flower from a stem, comprising:
   a frame including a first side panel, a second side panel, a front panel disposed between the first and second side panels, a base, a top panel disposed between the first and second side panels above the front panel, and an electronics shelf disposed between the base and the top panel;
   a first horizontal roller disposed on the frame between the first and second side panels;
   a second horizontal roller disposed on the frame between the first and second side panels, wherein the second horizontal roller is positioned below the first horizontal roller;
   a first motor disposed inside the first horizontal roller;
   a second motor disposed inside the second horizontal roller; and
   a power supply disposed on the electronics shelf and configured to supply power to the first motor and the second motor.

14. The apparatus of claim 13, further comprising a first handle and a second handle disposed on the frame.

15. The apparatus of claim 14, further comprising a debudding cone disposed on the front panel, wherein the debudding cone defines an inlet opening dimensioned to receive a portion of the stem.

16. The apparatus of claim 15, wherein the inlet opening is aligned with the first and second rollers such that a stem inserted into the inlet opening is received between the first and second rollers.

17. The apparatus of claim 16, further comprising a motor controller connected to the first and second rollers, wherein the motor controller is disposed on the electronics shelf, and wherein the power supply is configured to supply power to the motor controller.

18. A method of removing hemp flower from a stem, comprising:
   inserting a stem of a hemp plant into an opening in a debudding cone on a bucking machine;
   receiving the stem between a first motor roller and a second motor roller;
   rotating the first and second motor rollers in opposite directions to draw the stem into the bucking machine, wherein rotating the first and second motor rollers in opposite directions includes
      providing, from a motor controller housed within an electronics bay including an electronics shelf disposed above the first motor roller and the second motor roller, a first input signal to a first motor housed inside the first motor roller, wherein the first input signal is configured to cause the first motor to rotate the first motor roller in a first direction, and
      providing, from the motor controller, a second input signal to a second motor housed inside the second motor roller, wherein the second input signal is configured to cause the second motor to rotate the second motor roller in a second direction, wherein the first direction is opposite the second direction,
   engaging the hemp flower on the debudding cone as the stem is drawn into the bucking machine; and
   separating the hemp flower from the stem.

19. The method of claim 18, further comprising ejecting the stem out an open ejection bay on the back of the machine.

20. The machine of claim 1:
   wherein the first motor includes a cable end and a non-cable end, and wherein the cable end and the non-cable end are disposed opposite each other; and
   further comprising a first roller cable lug end protruding axially from the cable end of the first motor, a first roller non-cable end lug protruding axially from the non-cable end of the first motor and coupling to the second side panel, and a first motor cable coupled to the cable end of the first motor and the motor controller, wherein the motor controller being configured to rotate the first roller includes the motor controller being configured to provide an input signal to the first roller via the first motor cable.

\* \* \* \* \*